A. McNALLY.
MOUNTED MAPS.

No. 190,608. Patented May 8, 1877.

WITNESSES:
J. C. Wilde
N. H. Sherburne

INVENTOR:
Andrew McNally
By Gridley & Sherburne
Attys

UNITED STATES PATENT OFFICE.

ANDREW McNALLY, OF CHICAGO, ILLINOIS, ASSIGNOR TO RAND, McNALLY & CO., OF SAME PLACE.

IMPROVEMENT IN MOUNTED MAPS.

Specification forming part of Letters Patent No. 190,608, dated May 8, 1877; application filed December 18, 1876.

*To all whom it may concern:*

Be it known that I, ANDREW MCNALLY, of Chicago, in the county of Cook and State of Illinois, have invented new and useful Improvements in Mounted Maps; and I do hereby declare the following to be a full, clear, and exact description thereof, which will enable others skilled in the art to which my invention appertains to make and use the same, reference being had to the accompanying drawing, forming part of this specification, in which—

Figure 1:
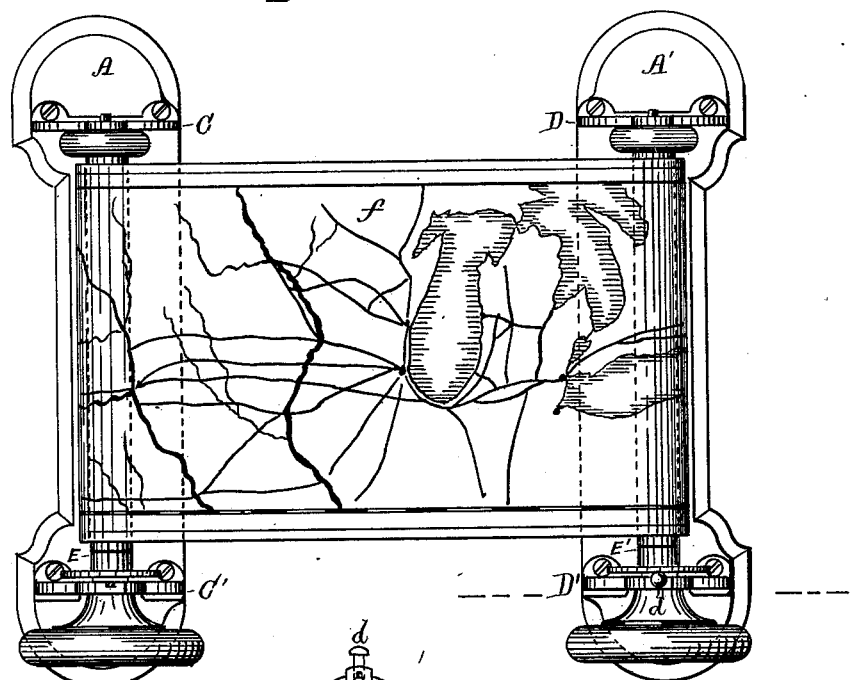
Figure 2:
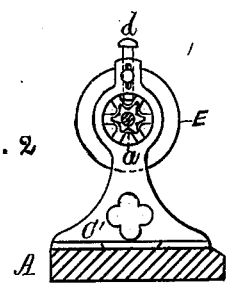

Figure 1 represents a front elevation of a mounted map embodying my invention, and Fig. 2 represents a transverse section of the same, taken on the line $x\ x$, Fig. 1.

Like letters of reference indicate like parts.

In the drawing, A A' represent cleats or strips of wood, which are so arranged as to admit of being firmly secured to the wall of a room, and in planes parallel with each other. C C' and D D' are brackets, permanently secured to the cleats A A', respectively, at or near the ends of said cleats. E and E' are rollers, which are journaled to the brackets C C' and D D', respectively, and are so arranged as to freely revolve, and are of the proper length to admit of rolling the map F, which is connected at its ends to the rollers E and E', respectively, upon and around said rollers, and between the brackets, and so that the map can be transferred from one roller to the other by the rotation of the rollers.

The end of each roller is provided with a series of notches, $a$, formed in the periphery of the hub of the roller, into which is fitted a sliding pawl, $d$, arranged to admit of being withdrawn from the notches when desired to roll the map, wholly or partly, from one roller to the other, and when said pawl is inserted in the notches it holds the roller in a fixed position.

By mounting a map upon two rollers affixed to brackets and cleats, substantially in the manner as shown and described, I am enabled to adjust a map, which might otherwise be too large, to the varied spaces on the walls of rooms by attaching the cleats to the wall, and at any desired distance from each other, and when so attached any part of the face of the map may be inspected by rolling the map from one roller upon the other by rotation of the rollers.

Having thus described my invention, what I claim as new, and desire to secure by Letters Patent, is—

The combination, with the map, of the rollers E E', brackets C C' and D D', and cleats A A', substantially as and for the purpose specified.

ANDREW McNALLY.

Witnesses:
N. H. SHERBURNE,
N. C. GRIDLEY.